(12) United States Patent
Herman et al.

(10) Patent No.: US 10,955,260 B2
(45) Date of Patent: Mar. 23, 2021

(54) PREDICTING A POINT-OF-INTEREST WAIT TIME FOR AN ESTIMATED TIME-OF-ARRIVAL

(71) Applicant: Ford Global Technologies, LLC, Dearborn, MI (US)

(72) Inventors: Dave A. Herman, Southfield, MI (US); Nicholas Colella, Gross Ile, MI (US); Andrea Bowes Chowanic, Commerce Township, MI (US); Colleen M. Cauvet, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 16/303,263

(22) PCT Filed: May 25, 2016

(86) PCT No.: PCT/US2016/034064
§ 371 (c)(1),
(2) Date: Nov. 20, 2018

(87) PCT Pub. No.: WO2017/204794
PCT Pub. Date: Nov. 30, 2017

(65) Prior Publication Data
US 2019/0204109 A1 Jul. 4, 2019

(51) Int. Cl.
*G01C 21/36* (2006.01)
*G06Q 10/04* (2012.01)
(Continued)

(52) U.S. Cl.
CPC ..... *G01C 21/3691* (2013.01); *G01C 21/3679* (2013.01); *G01C 21/3697* (2013.01);
(Continued)

(58) Field of Classification Search
CPC ............ G01C 21/3691; G01C 21/3697; G01C 21/3679; G06Q 50/30; G06Q 10/04; G08G 1/202
See application file for complete search history.

(56) References Cited

U.S. PATENT DOCUMENTS

2003/0220835 A1* 11/2003 Barnes, Jr. ........ H04M 1/72519
705/14.36
2008/0290182 A1* 11/2008 Bell ....................... G06Q 10/04
235/61 V
(Continued)

FOREIGN PATENT DOCUMENTS

JP 2014020936 A * 2/2014

*Primary Examiner* — Rodney A Butler
(74) *Attorney, Agent, or Firm* — Brandon Hicks; Eversheds Sutherland (US) LLP (57) ABSTRACT

Methods and apparatus to determine a predicted wait time at a commercial point-of-interest for an estimated time-of-arrival are disclosed. An example method includes determining an estimated time-of-arrival of a vehicle at a commercial point-of-interest and obtaining current wait-time data and historical wait-time data for the estimated time-of-arrival for the commercial point-of-interest. The example method includes determining, via a processor, a predicted wait time for the estimated time-of-arrival based on the current wait-time data and the historical wait-time data and communicating the predicted wait time to a user interface of the vehicle.

16 Claims, 7 Drawing Sheets

(51) Int. Cl.
*G06Q 50/30* (2012.01)
*G08G 1/00* (2006.01)

(52) U.S. Cl.
CPC ............ G06Q 10/04 (2013.01); G06Q 50/30 (2013.01); G08G 1/202 (2013.01)

(56) References Cited

U.S. PATENT DOCUMENTS

| | | | | |
|---|---|---|---|---|
| 2009/0228325 | A1* | 9/2009 | Simmons | G06Q 30/0601 705/7.23 |
| 2010/0153207 | A1* | 6/2010 | Roberts | G01C 21/3679 705/14.41 |
| 2012/0257518 | A1* | 10/2012 | Erhart | H04L 41/5061 370/252 |
| 2013/0116882 | A1* | 5/2013 | Link, II | G01C 21/00 701/31.4 |
| 2013/0304534 | A1* | 11/2013 | Mehta | G06Q 10/1095 705/7.19 |
| 2014/0180848 | A1* | 6/2014 | Argue | G07G 1/0036 705/16 |
| 2014/0257914 | A1* | 9/2014 | Calman | G06Q 10/0633 705/7.27 |
| 2015/0025799 | A1* | 1/2015 | Jackson | G01C 21/00 701/519 |
| 2015/0081348 | A1* | 3/2015 | Avera | G06Q 10/02 705/5 |
| 2016/0148238 | A1* | 5/2016 | He | G06Q 30/0207 705/14.1 |
| 2016/0314482 | A1* | 10/2016 | Basu | G06Q 30/0251 |
| 2016/0321548 | A1* | 11/2016 | Ziskind | G06N 7/005 |
| 2016/0363450 | A1* | 12/2016 | Sahay | G01C 21/20 |
| 2017/0178084 | A1* | 6/2017 | Barreira Avegliano | G06Q 10/1097 |
| 2018/0336784 | A1* | 11/2018 | Liu | G08G 1/147 |

* cited by examiner

PREDICTING A POINT-OF-INTEREST WAIT TIME FOR AN ESTIMATED TIME-OF-ARRIVAL

FIELD OF THE DISCLOSURE

This disclosure relates generally to determining a predicted wait time and, more particularly, to methods and apparatus to determine a predicted wait time at a commercial point-of-interest for an estimated time-of-arrival.

BACKGROUND

In recent years, vehicles (e.g., automobiles such cars, vans, trucks, etc.) often include a human-machine interface that enables a user to obtain information. For example, some human-machine interfaces are in communication with a global positioning system to enable the user to identify a current location of the vehicle. In some examples, the human-machine interface of the vehicle displays a map that identifies potential points-of-interest (e.g., gas stations, coffee shops, etc.) near and/or along a travel route of the vehicle. Further, the human-machine interface may provide an estimated time-of-arrival at which the vehicle is to reach a destination (e.g., one of the identified points-of-interest).

SUMMARY

In one example, a method includes determining an estimated time-of-arrival of a vehicle at a commercial point-of-interest and obtaining current wait-time data and historical wait-time data for the estimated time-of-arrival for the commercial point-of-interest. The method includes determining, via a processor, a predicted wait time for the estimated time-of-arrival based on the current wait-time data and the historical wait-time data and communicating the predicted wait time to a user interface of the vehicle.

In another example, an apparatus includes an ETA determiner to determine an estimated time-of-arrival of a vehicle at a commercial point-of-interest and a wait-time data receiver to obtain current wait-time data and historical wait-time data for the commercial point-of-interest. The apparatus includes a wait-time calculator to determine a predicted wait time for the estimated time-of-arrival based on the current wait-time data and the historical wait-time data and a wait-time communicator to communicate the predicted wait time to a user interface.

In another example, a tangible computer readable storage medium includes instructions which, when executed, cause a machine to at least determine an estimated time-of-arrival of a vehicle at a commercial point-of-interest, determine a predicted wait time for the estimated time-of-arrival based on historical wait-time data of the estimated time-of-arrival and current wait-time data for the commercial point-of-interest, and communicate the predicted wait time for the estimated time-of-arrival to a user interface.

BRIEF DESCRIPTION OF THE DRAWINGS

The figures are not to scale. Additionally, the same reference numbers will be used throughout the drawing(s) and accompanying written description to refer to the same or like parts.

DETAILED DESCRIPTION

Vehicles (e.g., automobiles such cars, vans, trucks, etc.) often include a human-machine interface installed in a dashboard of the vehicle to provide information to and/or receive information from a driver and/or a passenger of the vehicle. For example, the human-machine interfaces may be utilized to control a temperature within the vehicle, to control a radio of the vehicle, to audibly interact with a mobile device of the driver, etc. Further, some human-machine interfaces of vehicles are in communication with a global positioning system to enable a user (e.g., a driver and/or a passenger) to identify a current location of the vehicle.

For example, the human-machine interface of some known vehicles displays a map that provides directions to a destination and/or an estimated time-of-arrival for the vehicle at the destination. The maps displayed by some human-machine interfaces identify potential points-of-interest (POIs) (e.g., commercial points-of-interest such as shops or restaurants) that are nearby and/or along a travel route of the vehicle. In some examples, the human-machine interface displays estimated time-of-arrivals for the identified commercial point-of-interests. In such examples, while the human-machine interface provides the user with the estimated time-of-arrival at the commercial point-of-interest, the user may not know how a stop at the commercial point-of-interest will affect the estimated time-of-arrival for his or her ultimate destination. For example, the user of the human-machine interface is unaware of how much time waiting in line at the commercial point-of-interest along the travel route (e.g., a gas station, a coffee shop, etc.) will add to the estimated time-of-arrival for his or her ultimate destination (e.g., a work location, home, etc.).

The example methods and apparatus disclosed herein determine a predicted wait time for a commercial point-of-interest for an estimated time-of-arrival of the vehicle. Thus, the examples disclosed herein provide the user of the vehicle with an estimated duration for travelling to the commercial point-of-interest and another estimated duration for waiting in a queue upon arriving at the commercial point-of-interest to enable the user to determine whether to stop at the commercial point-of-interest and/or to determine which commercial point-of-interest to visit.

To determine the wait time at the commercial point-of-interest for the estimated time-of-arrival of the vehicle, the example methods and apparatus disclosed herein include a wait-time predictor that determines an estimated time-of-arrival of a vehicle at a commercial point-of-interest. The example wait-time predictor obtains current wait-time data of the commercial point-of-interest and historical wait-time data for the estimated time-of-arrival at the commercial point-of-interest. Based on the obtained current wait-time data and the historical wait-time data, the wait-time predictor determines and/or calculates a predicted wait time for the estimated time-of-arrival that is communicated to a user interface (e.g., a human-machine interface) of a vehicle. In some examples, the user interface enables a driver and/or a passenger of the vehicle to submit a preorder to the commercial point-of-interest that is to be prepared for the estimated time-of-arrival of the vehicle.

To determine the estimated time-of-arrival of the vehicle at the commercial point-of-interest, the wait-time predictor may be in communication with a global navigation satellite system and/or a global positioning system that calculates the estimated time-of-arrival. In some examples, the commercial point-of-interest is identified and/or selected by the user, via the user interface of the vehicle, based on a commercial point-of-interest category, a predetermined geographic region, a distance from a current location of the vehicle, a distance from a predetermined travel route of the vehicle and/or historical vehicle data indicating routine and/or habitual trips to a commercial point-of-interest.

In some examples, the current wait-time data for the commercial point-of-interest includes a current queue size and the historical wait-time data includes a historical queue size for a particular time of day and a historical wait time. The current wait-time data may be obtained from sensors and/or data systems of the commercial point-of-interest. For example, the current wait-time data may be collected from a camera and/or another sensor (e.g., a vehicle loop detector positioned along a drive-thru) installed at the commercial point-of-interest that identifies a current queue size and/or a current wait-time. Additionally or alternatively, the current wait-time data may be collected from an order processing system that the commercial point-of-interest maintains for its own analysis. Further, the current wait-time data may be collected via a crowdsourcing application that enables a customer (e.g., a customer with a mobile device) waiting in line to report the current wait time at the commercial point-of-interest. In some examples, the historical wait-time data is an aggregate of previously collected current wait-time data. Further, the historical wait-time data may include weather condition data to enable the current wait time at the commercial point-of-interest to be compared to past instances with similar weather conditions.

To determine the predicted wait time for the estimated time-of-arrival at the commercial point-of-interest, the wait-time predictor utilizes the obtained current wait-time data (e.g., the current queue size), the obtained historical wait-time data (e.g., the historical queue size, the historical wait time), and a decay rate factor. For example, the decay rate factor decreases (e.g., approaches 0) as the vehicle approaches the commercial point-of-interest to reduce an effect of the historical wait-time data and increase an effect of the current wait-time data as the vehicle approaches the commercial point-of-interest.

In some examples, the wait-time predictor wirelessly receives the current wait-time data and historical wait-time data via a telematics control unit that is installed in the vehicle and in communication with the wait-time predictor. Additionally or alternatively, the wait-time predictor may wirelessly receive the current wait-time data and historical wait-time data via a mobile device located in the vehicle (e.g., a mobile device of the driver and/or a passenger of the vehicle) that is in wireless communication with the wait-time predictor.

Figure 1:
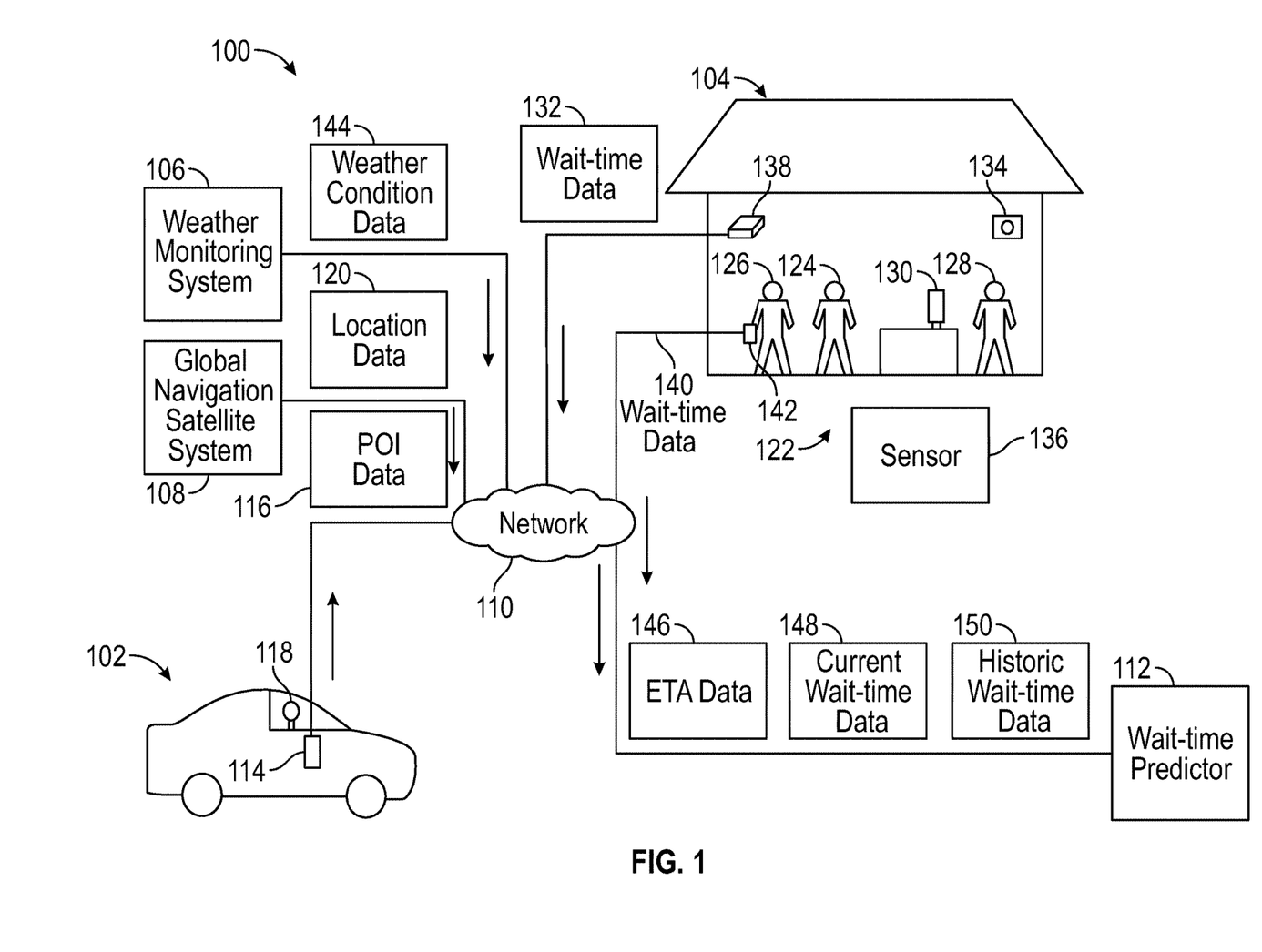
FIG. 1 is a block diagram of an example environment in which data is collected to determine a predicted wait time at a commercial point-of-interest for an estimated time-of-arrival of a vehicle.

FIG. 1 is a block diagram of an example environment 100 that includes a vehicle 102, a commercial point-of-interest (POI) 104, a weather monitoring system 106, a global navigation satellite system (GNSS) 108, a network 110, and a wait-time predictor 112. In the illustrated example, data is collected from the vehicle 102, the commercial POI 104, the weather monitoring system 106, the (GNSS) 108 and/or other data sources to enable the wait-time predictor 112 to determine a predicted wait time for the commercial POI 104 for an estimated time-of-arrival (ETA) of the vehicle 102.

In the environment 100 of FIG. 1, the vehicle 102 (e.g., a car, a van, a truck, etc.) includes a user interface 114 (e.g., a human-machine interface installed in the dashboard) that collects point-of-interest (POI) data 116 from a passenger 118 (e.g., a driver) of the vehicle 102. The POI data 116 identifies a point-of-interest (e.g., the commercial POI 104) that is a destination for the vehicle 102. As illustrated in FIG. 1, the GNSS 108 provides location data 120 that indicates a current location of the vehicle 102, for example, as the vehicle 102 travels to the commercial POI 104.

The commercial POI 104 of the illustrated example is an establishment that provides goods and/or services (e.g., a coffee shop, a dry cleaner, a restaurant, a post office, etc.). The commercial POI 104 includes a queue 122 in which customers 124, 126 wait to be served by an employee 128 of the commercial POI 104. Thus, a customer (e.g., the customer 126) waits in line at the commercial POI 104 for an amount of time (e.g., a wait time) prior to being served by the employee 128.

The commercial POI 104 includes an order processing system 130 that enables the commercial POI 104 to manage orders placed by customers (e.g., the customers 124, 126). In the illustrated example, the order processing system 130 collects wait-time data 132 associated with a wait time of customers of the commercial POI 104. For example, the wait-time data 132 collected and/or stored by the order processing system 130 indicates current queue conditions (e.g., a current queue size, a current wait time), targeted queue conditions (e.g., a targeted wait time) and/or historical queue conditions (e.g., a historical queue size, a historical wait time) of the queue 122 of the commercial POI 104. Additionally or alternatively, the commercial POI 104 and/or another entity (e.g., an entity determining the predicted wait time) may install sensors in and/or near the commercial POI 104 to collect the wait-time data 132. In the illustrated example, a camera 134 is installed in the commercial POI 104 to measure the current queue conditions in the commercial POI 104. Further, a sensor 136 (e.g., a vehicle loop detector) is positioned outside of the commercial POI 104 to measure current queue conditions of a drive-thru of the commercial POI 104.

In the illustrated example, the wait-time data 132 collected from the camera 134, the sensor 136 and/or the order processing system 130 are communicated to a communication device 138 via wired and/or wireless connections (e.g., a cable/DSL/satellite modem, a cell tower, etc.) to store the collected wait-time data 132 and/or communicate the wait-time data 132 to the network 110. In other examples, the camera 134, the sensor 136 and/or the order processing system 130 may be in direct communication with the network 110.

Additionally or alternatively, wait-time data 140 is collected via a crowdsourcing application that enables customers (e.g., the customers 124, 126) to report current queue conditions of the commercial POI 104. In the illustrated example, the customer 126 utilizes the crowdsourcing application via a mobile device 142 (e.g., a cell phone, a smart phone, a tablet such as an iPad™) to report the current queue conditions of the commercial POI 104 while waiting in the queue 122.

Further, in the illustrated example, the weather monitoring system 106 provides weather condition data 144. As described in further detail below, the weather condition data 144 (e.g., current weather condition data) may be utilized to compare current wait-time conditions to wait times of previous days, times and/or day-times in which there were similar weather conditions.

The network 110 communicatively couples the vehicle 102, the commercial POI 104, the weather monitoring system 106, the (GNSS) 108 and/or other data sources to the wait-time predictor 112. For example, the POI data 116 collected from the user interface 114 of the vehicle 102, the location data 120 collected from the GNSS 108, the wait-time data 132 collected from the commercial POI 104 via the communication device 138, the wait-time data 140 collected from the crowdsourcing application via the mobile device 142 and/or the weather condition data 144 collected from the weather monitoring system 106 are communicated to the wait-time predictor 112 through the network 110 (e.g., the Internet, a local area network, a wide area network, a cellular network, etc.) via wired and/or wireless connections (e.g., a cable/DSL/satellite modem, a cell tower, etc.).

As illustrated in FIG. 1, the wait-time predictor 112 collects ETA data 146, current wait-time data 148, and historical wait-time data 150 that is based on the POI data 116, the location data 120, the wait-time data 132, 140, the weather condition data 144 and/or other collected data. The wait-time predictor 112 utilizes the ETA data 146, the current wait-time data 148, and the historical wait-time data 150 to determine a predicted wait time at the commercial point-of-interest 104 for an ETA of the vehicle 102. For example, the wait-time predictor 112 determines the ETA utilizing the ETA data 146 and determines the predicted wait time for the ETA utilizing the current wait-time data 148 (e.g., data for current queue conditions such as current queue size and current wait time) and the historical wait-time data 150 (e.g., data for historical queue conditions such as historical queue size and historical wait time). The wait-time predictor 112 communicates the predicted wait-time to the user interface 114 of the vehicle 102 to enable the passenger 118 to determine how a visit to the commercial POI 104 will affect an ETA for his or her ultimate destination (e.g., work location, home, etc.).

Figure 2:
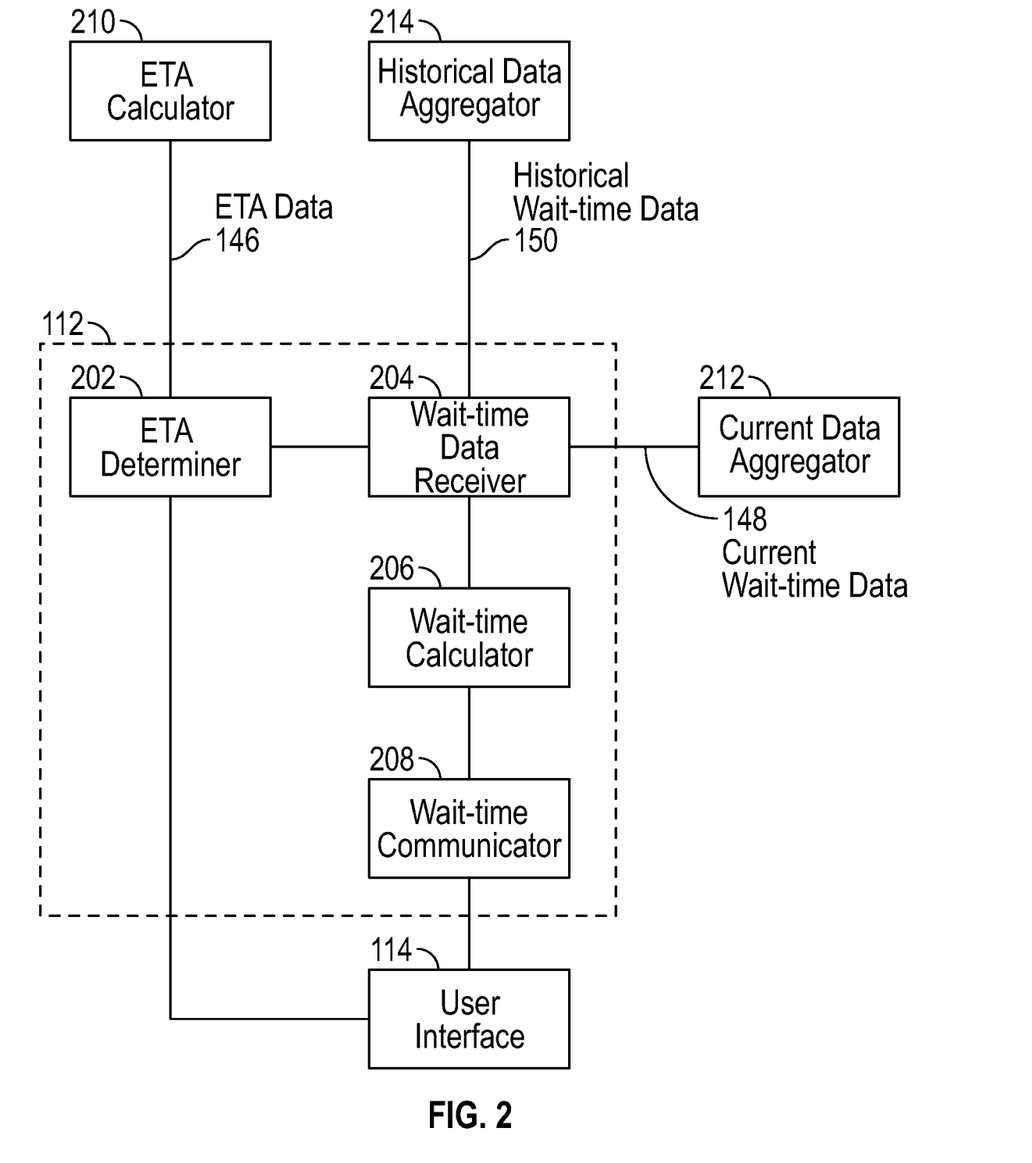
FIG. 2 is a block diagram of an example implementation of the wait-time predictor of FIG. 1 that is to determine the predicted wait time for the estimated time-of-arrival.

FIG. 2 is a block diagram of an example implementation of the wait-time predictor 112 of FIG. 1 that is to utilize the ETA data 146, the current wait-time data 148, and the historical wait-time data 150 to determine a predicted wait time for an ETA of a vehicle (e.g., the vehicle 102 of FIG. 1) at a commercial point-of-interest (e.g., the commercial POI 104 of FIG. 1). As illustrated in FIG. 2, the wait-time predictor 112 includes an ETA determiner 202, a wait-time data receiver 204, a wait-time calculator 206, and a wait-time communicator 208. In some examples, the wait-time predictor 112 is implemented by processor(s) located in the vehicle 102 (e.g., in a protocol interface module installed in the vehicle). In other examples, the wait-time predictor 112 is implemented by processor(s) that are external to the vehicle 102 and in communication with processor(s) in the vehicle 102.

The ETA determiner 202 of the illustrated example determines the ETA of the vehicle 102 at the commercial POI 104. In the illustrated example, the ETA determiner 202 obtains the ETA data 146 from an ETA calculator 210 that is in communication with the wait-time predictor 112 (e.g., via the network 110 of FIG. 1). For example, the ETA calculator 210 calculates the ETA of the vehicle 102 at the commercial POI 104 based on the location data 120 provided by the GNSS 108 (FIG. 1), the weather condition data 144 (e.g., current weather condition data) provided by the weather monitoring system 106 (FIG. 1) and/or other additional information such as traffic data of the route of the vehicle 102 to the commercial POI 104. In other examples, the ETA determiner 202 obtains the location data 120, the weather condition data 144 and/or the other data directly and calculates the ETA.

As illustrated in FIG. 2, the wait-time data receiver 204 obtains the current wait-time data 148 from a current data aggregator 212 and obtains the historical wait-time data 150 from the historical data aggregator 214. For example, the current data aggregator 212 collects, aggregates, and analyzes (e.g., averages) current wait-time data of the commercial POI 104 (e.g., the wait-time data 132, 140 of the commercial POI 104) to determine a current queue size (e.g., a number of people, groups and/or orders) and/or a current wait time (e.g., in second, minutes, hours, etc.) for the commercial POI 104. The current wait-time data 148 received by the wait-time data receiver 204 includes the current queue size and/or the current wait time calculated by the current data aggregator 212. In other examples, the wait-time data receiver 204 of the wait-time predictor 112 collects the wait-time data 132, 140 associated with the commercial POI 104 and calculates the current queue size and/or the current wait time.

The historical data aggregator 214 of the illustrated example collects, aggregates, and analyzes past wait-time data of the commercial POI 104. Additionally, the historical data aggregator 214 may collect other historical data such as the weather condition data 144. The historical data aggregator 214 utilizes the aggregated wait-time data of the past to determine a historical wait time of the historical wait-time data 150. Further, the historical data aggregator 214 identifies previous instances for which a set of conditions and/or characteristics are equivalent and/or substantially similar to the conditions of the commercial POI 104 for the ETA and determines a historical queue size of the historical wait-time data 150 based on the collected wait-time data for those previous instances. For example, the historical queue size of the historical wait-time data 150 represents an average queue size at the commercial POI 104 for a time of day (e.g., in 15 minute increments such as 7:30-7:45 AM, 4:45-5:00 PM, etc.), a day (Monday, Tuesday, etc.), a month (January, February, etc.), a date (the $1^{st}$ of the month, the $15^{th}$ of the month, etc.), a season (winter, spring, etc.), weather conditions (e.g., sunny, rainy, warm, below freezing, etc.) and/or any combination thereof that corresponds to the ETA of the vehicle 102. For example, the historical queue size may include the average queue size at the commercial POI 104 for all Mondays in the fall that are rainy between 1:15 PM and 1:30 PM. In other examples, the wait-time data receiver 204 of the wait-time predictor 112 collects the historical wait-time data (e.g., the wait-time data 132, 140) and/or other historical data (e.g., the weather condition data 144) associated with the commercial POI 104 and calculates the historical queue size and/or the historical wait time for the commercial POI 104 for the ETA.

The wait-time calculator 206 of the wait-time predictor 112 utilizes the current wait-time data 148 (e.g., the current queue size, the current wait time) and the historical wait-time data 150 (e.g., the historical queue size, the historical wait time) obtained by the wait-time data receiver 204 to determine a predicted wait time for the commercial POI 104 for the ETA of the vehicle 102. The wait-time calculator 206 determines the predicted wait time based on Equation 1 provided below.

$$PWT=(CQS*(1-drf)+HQS*drf)*HWT \quad \text{Equation 1}$$

In Equation 2 provided above, PWT represents the predicted wait time (e.g., a measurement of time) to be determined, CQS represents the current queue size quantity at the commercial POI 104 (e.g., a measurement of a number of customers), HQS represents the historical queue size of the commercial POI 104 for the ETA (e.g., a measurement of a number of customers), HWT represents the historical wait time per customer of the commercial POI 104 (e.g., a measurement of time per customer), and drf represents a decay rate factor. The decay rate factor is a weight (e.g., having a value of between 0 and 1) that correlates to an estimated travel time for the vehicle 102 to arrive at the commercial POI 104. For example, because the current wait conditions are less indicative of the wait conditions for the ETA the farther the vehicle 102 is from the commercial POI 104, the decay rate factor decreases as the vehicle 102 approaches the commercial POI 104. Thus, the decay rate factor of Equation is near a value of 1 when the vehicle 102 is far from the commercial POI 104 and is near a value of 0 when the vehicle 102 is near the commercial POI 104.

To determine the predicted wait time for the ETA based on Equation 1 provided above, the wait-time calculator 206 obtains and/or determines the current queue size, CQS; the historical queue size, HQS, the historical wait time per customer, HWT; and the decay rate factor, drf. For example, if the ETA determiner 202 estimates that the vehicle 102 is to arrive at the commercial POI 104 at approximately 2:22 PM on a Sunday afternoon in October, the wait-time data receiver 204 obtains the historical queue size, HQS, at the commercial POI 104 for the time period between 2:15 PM and 2:30 PM on Sundays in the fall (e.g., 5 customers). The wait-time data receiver 204 also obtains the historical wait time per customer, HWT (e.g., 1.5 minutes per customer), and the current queue size, CQS (e.g., 3 customers). Further, to enable the wait-time calculator 206 to determine a value of the decay rate factor, the ETA determiner 202 obtains an estimated travel time (e.g., 20 minutes) for the vehicle 102 to reach the commercial POI 104 that correlates to a value of the decay rate factor, drf (e.g., 0.3). Based on the collected values for HQS, HWT, CQS, and drf, the wait-time calculator 206 utilizes Equation 1 to determine the predicted wait time at the commercial POI 104 for 2:22 PM (e.g., about 5.4 minutes).

Further, the wait-time predictor 112 recalculates and/or updates the predicted wait time (e.g., periodically or aperiodically) based on changing conditions (e.g., a change in the current queue size, the weather conditions, the ETA, etc.) For example, the estimated travel time of the vehicle 102 decreases and, thus, the decay rate factor, drf, decreases as the vehicle 102 approaches the commercial POI 104. As a result, the effect of the historical queue size on the predicted wait time decreases and the effect of the current queue size on the predicted wait time increases as the vehicle 102 approaches the commercial POI 104. Thus, in accordance with equation 1, the predicted wait time determined by the wait-time calculator 206 is affected more by the historical queue size, HQS, when the vehicle 102 is farther away from the commercial POI 104 and is affected more by the current queue size, CQS, when the vehicle 102 is closer to the commercial POI 104.

As illustrated in FIG. 2, the wait-time communicator 208 of the wait-time predictor 112 provides the predicted wait time determined by the wait-time calculator 206 to the user interface 114 to enable the predicted wait time to be displayed and/or otherwise communicated to the passenger 118 of the vehicle 102. Additionally, the wait-time communicator 208 and/or the ETA determiner 202 may provide the ETA and/or the estimated travel time to the user interface 114 to enable such information to be displayed and/or otherwise communicated to the passenger 118 of the vehicle 102.

Additionally, the user interface 114 (e.g., via a display 800 of FIG. 8) may enable the passenger 118 to submit a preorder to the commercial POI 104 so that the order is ready for the passenger 118 for the ETA, thereby substantially reducing the effects of the wait time at the commercial POI 104 on the passenger 118. In such examples, the wait-time predictor 112 identifies when a preorder is submitted. In some examples, because the importance of the wait time is substantially reduced and/or negligible when a preorder is submitted, the wait-time communicator 208 stops communicating updated predicted wait times to the user interface 114 upon identifying that a preorder has been submitted. Further, the wait-time predictor 112 and/or the user interface 114 may collect and/or store historical vehicle data that includes information regarding the commercial POIs at which the vehicle 102 stops and/or when the vehicle 102 stops at the respective commercial POIs. In some examples, the historical vehicle data identifies a commercial POI (e.g., the commercial POI 104) and a corresponding time at which the vehicle makes routine and/or habitual trips (e.g., the vehicle 102 arrives at the commercial POI 104 at about 8:15 AM approximately every weekday morning).

While an example manner of implementing the wait-time predictor 112 of FIG. 1 is illustrated in FIG. 2, one or more of the elements, processes and/or devices illustrated in FIG. 2 may be combined, divided, re-arranged, omitted, eliminated and/or implemented in any other way. Further, the example ETA determiner 202, the example wait-time data receiver 204, the example wait-time calculator 206, the example wait-time communicator 208 and/or, more generally, the example wait-time predictor 112 of FIG. 1 may be implemented by hardware, software, firmware and/or any combination of hardware, software and/or firmware. Thus, for example, any of the example ETA determiner 202, the example wait-time data receiver 204, the example wait-time calculator 206, the example wait-time communicator 208 and/or, more generally, the example wait-time predictor 112 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example ETA determiner 202, the example wait-time data receiver 204, the example wait-time calculator 206, the example wait-time communicator 208 and/or the example wait-time predictor 112 is/are hereby expressly defined to include a tangible computer readable storage device or storage disk such as a memory, a digital versatile disk (DVD), a compact disk (CD), a Blu-ray disk, etc. storing the software and/or firmware. Further still, the example wait-time predictor 112 of FIG. 1 may include one or more elements, processes and/or devices in addition to, or instead of, those illustrated in FIG. 4, and/or may include more than one of any or all of the illustrated elements, processes and devices.

Figure 3:
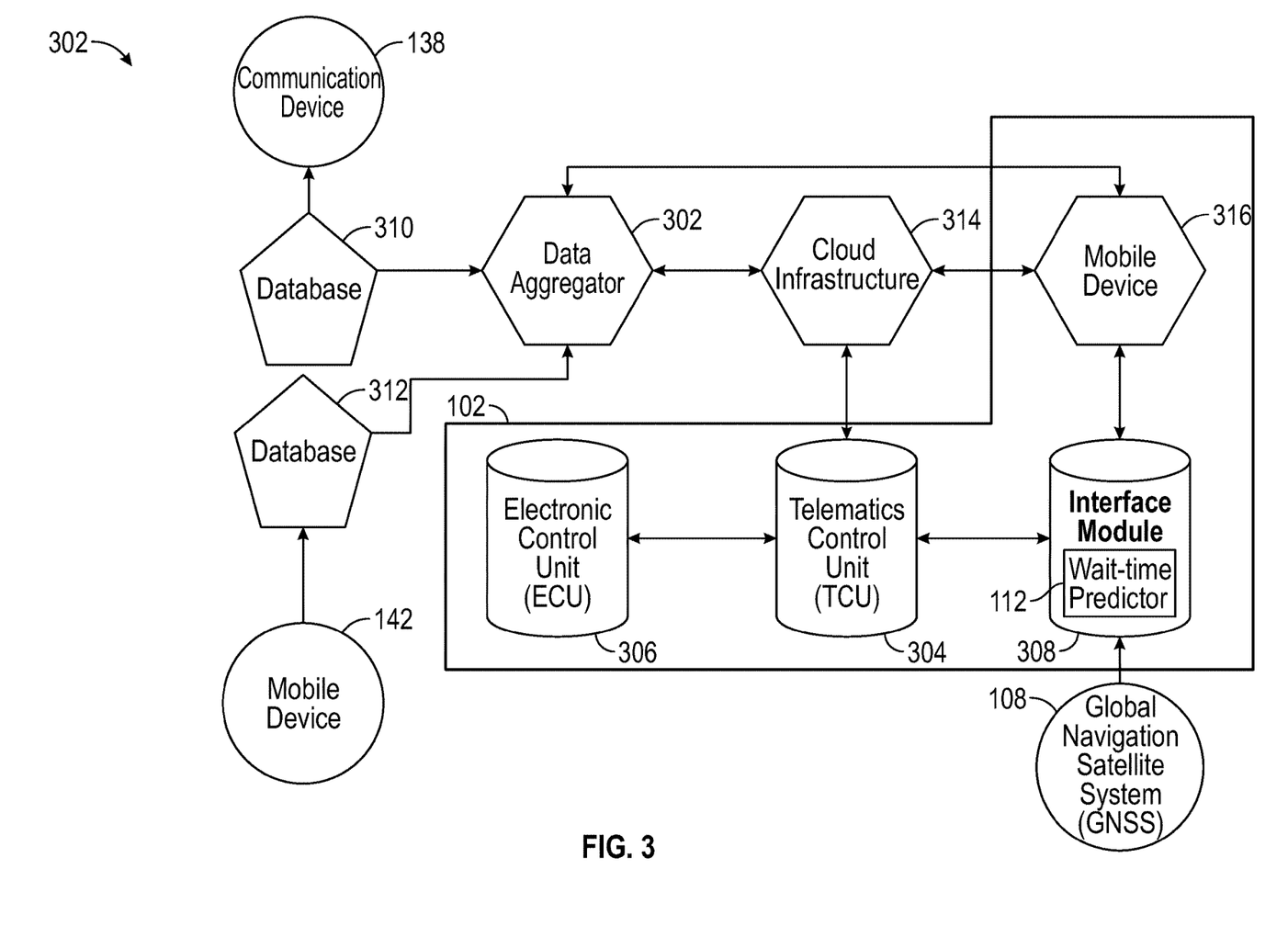
FIG. 3 is a block diagram of an example environment in which the vehicle of FIG. 1 is in communication with an example data aggregator.

FIG. 3 is a block diagram of an example environment 300 in which the vehicle 102 is in communication with an example data aggregator 302 and the GNSS 108 (e.g., via the network 110 of FIG. 1). As illustrated in FIG. 3, the vehicle 102 includes a telematics control unit (TCU) 304, an electronic control unit (ECU) 306, and an interface module 308 (e.g., an accessory protocol interface module).

The interface module 308 includes the wait-time predictor 112 that determines the predicted wait time at the commercial POI 104 (FIG. 1) for the ETA. The interface module 308 is in wireless communication with the GNSS 108, for example, via radio-frequency signals to identify the location data 120 (FIG. 1) and/or the ETA data 146 (FIGS. 1 and 2) of the vehicle 102. Further, the interface module 308 is in communication with the user interface 114 (FIGS. 1 and 2) of the vehicle 102 to enable the user interface 114 to communicate the predicted wait time, the ETA and/or other information to the passenger 118 of the vehicle 102. In some examples, the interface module 308 includes Bluetooth®, Wi-Fi® and/or other wireless connectivity.

As illustrated in FIG. 3, the interface module 308 is in communication with the TCU 304, for example, via a controller area network (i.e., a CAN bus) and/or another local area network (e.g., via an Ethernet connection). For example, the TCU 304 is a cellular data modem that enables the interface module 308 to be in communication with a wireless network (e.g., the network 110). Further, the TCU 304 is in communication with the ECU 306 and/or other ECUs of the vehicle 102, for example, via a controller area network (i.e., a CAN bus) and/or another local area network (e.g., via an Ethernet connection). Each of the ECU 306 and/or the other ECUs of the vehicle 102 may control an electronic system (e.g., a crash prediction system, an anti-lock braking system, a door control system, an engine control system, etc.) of the vehicle 102.

As illustrated in FIG. 3, the environment 300 includes a database 310 (e.g., a commercial POI database) that collects and stores the wait-time data 132 (FIG. 1) of the commercial POI 104. For example, the database 310 is in communication with the communication device 138 via the network 110 (e.g., via the Internet) to receive the wait-time data collected from the order processing system 130, the camera 134 and/or the sensor 136 (FIG. 1) of commercial POI 104. Further, the environment 300 includes a database 312 (e.g., a crowdsourcing application database) that collects and stores the wait-time data 140 (FIG. 1) associated with the commercial POI 104 that was obtained from a crowdsourcing application for example, via the mobile device 142 of the customer 126 (FIG. 1) of the commercial POI 104. For example, the database 312 obtains the wait-time data 140 from the mobile device 142 via the network 110 (e.g., via a cellular network (e.g., a 4G LTE network) and/or the Internet).

The database 310 and the database 312 are in communication with the data aggregator 302, for example, via the network 110 (e.g., via the Internet). The data aggregator 302 aggregates the wait-time data 132 and/or the wait-time data 140 obtained for the commercial POI 104. For example, the data aggregator 302 of FIG. 3 includes the current data aggregator 212 and/or the historical data aggregator 214 of FIG. 2.

Further, the data aggregator 302 provides the current wait-time data 148 and the historical wait-time data 150 (FIG. 1) to the interface module 308 to enable the wait-time predictor 112 to determine the predicted wait time for the ETA. In the illustrated example in which the vehicle 102 includes the TCU 304, the interface module 308 receives the current wait-time data 148 and the historical wait-time data 150 from the data aggregator 302 via the TCU 304 and a cloud infrastructure 314. For example, the data aggregator 302 is in wireless communication with the cloud infrastructure 314 via the network 110 (e.g., via the Internet), the cloud infrastructure 314 is in wireless communication with the TCU 304 via the network 110 (e.g., via a cellular network), and the TCU 304 is in communication with the interface module 308 via a localized area network of the vehicle 102. The cloud infrastructure 314 limits connectivity to the TCU 304 of the vehicle 102 to known safe data sources such as the data aggregator 302.

Additionally or alternatively, the interface module 308 may receive the current wait-time data 148 and the historical wait-time data 150 from the data aggregator 302 via an application installed in a mobile device 316 that is located in and/or near the vehicle 102 (e.g., a mobile device of the passenger 118 of the vehicle 102) and is in wireless communication with the interface module 308. For example, the data aggregator 302 communicates to the interface module 308 via the application of the mobile device 316 when the data aggregator 302 is unable to communicate with the TCU 304 of the vehicle 102. In other examples, the data aggregator 302 communicates to the interface module 308 via the application of the mobile device 316 when the vehicle 102 does not include a TCU.

In the illustrated example, the data aggregator 302 is in wireless communication with the application of the mobile device 316 via the network 110 (e.g., in communication via a cellular network), and the application of the mobile device 316 is in wireless communication with the interface module 308 (e.g., via AppLink®). Further, as illustrated in FIG. 3, the application of the mobile device 316 is in communication with the cloud infrastructure 314 to enable the application of the mobile device 316 to be in communication with the TCU 304 of the vehicle 102 and/or to enable the cloud infrastructure 314 to limit communication between the data aggregator 302 and the application of the mobile device 316.

Figure 4:
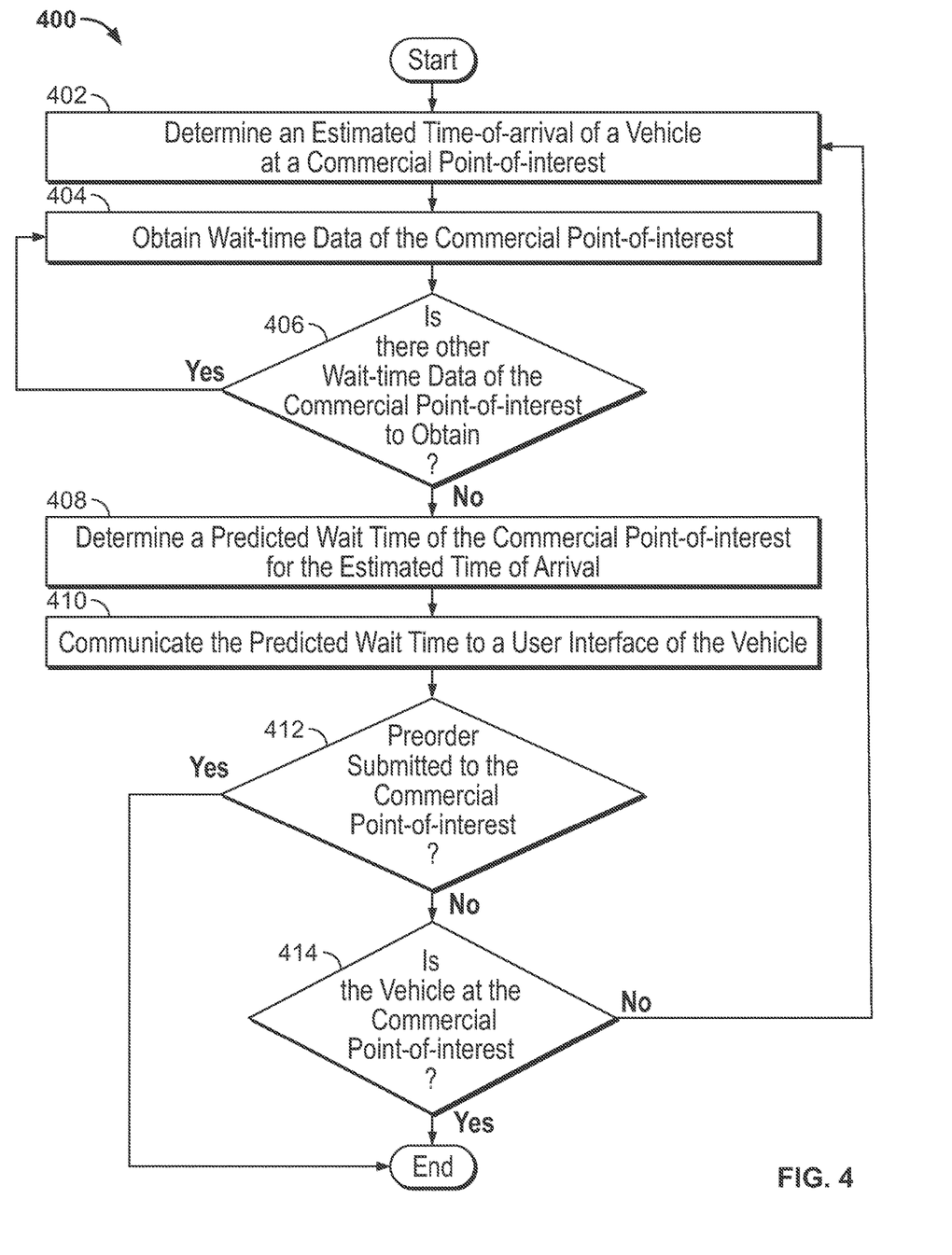
FIG. 4 is a flow diagram representative of an example method that may be executed to implement the example wait-time predictor of FIGS. 1 and 2 to determine a predicted wait time at a commercial point-of-interest for an estimated time-of-arrival of a vehicle.

A flowchart representative of an example method 400 for implementing the wait-time predictor 112 is shown in FIG. 4. In this example, the method 400 may be implemented using machine readable instructions that comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 4, many other methods of implementing the example wait-time predictor 112 may alternatively be used. For example, the order of execution of the blocks may be changed, and/or some of the blocks described may be changed, eliminated, or combined.

As mentioned above, the example method 400 of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Turning to FIG. 4, the method 400 may be executed to implement the wait-time predictor 112 of FIGS. 1, 2 and/or 3 to determine a predicted wait time at a commercial point-of-interest for an ETA of a vehicle. Initially, at block 402, the ETA determiner 202 (FIG. 2) determines an ETA of the vehicle 102 (FIG. 1) at the commercial POI 104 (FIG. 1). For example, the ETA determiner 202 receives the ETA data 146 (FIGS. 1 and 2) that includes the ETA from the ETA calculator 210 (FIG. 2). In other examples, the ETA determiner 202 calculates the ETA based on other data (e.g., the location data 120 and/or the weather condition data 144 of FIG. 1) received by the ETA determiner 202.

At block 404, the wait-time data receiver 204 obtains wait-time data of the commercial POI 104. For example, the wait-time data receiver 204 collects the current wait-time data 148 (FIGS. 1 and 2) that includes a current wait time and/or a current queue size from the current data aggregator 212 (FIG. 2) and/or the data aggregator 302 (FIG. 3). Further, the wait-time data receiver 204 determines whether there is other wait-time data of the commercial-point-of-interest to obtain (block 406). If the wait-time data receiver 204 determines that there is other wait-time data to obtain, block 404 is repeated. For example, the wait-time data receiver 204 repeats block 404 to collect the historical wait-time data 150 (FIGS. 1 and 2) that includes a historical wait time and/or a historical queue size from the historical data aggregator 214 (FIG. 2) and/or the data aggregator 302. Blocks 404, 406 are repeated by the wait-time data receiver 204 until no other wait-time data is identified.

At block 408, the wait-time calculator 206 (FIG. 2) determines a predicted wait time based on the ETA determined at block 402, the wait-time data obtained at block 404, and Equation 2 provided below.

$$PWT=(CQS*(1-drf)+HQS*drf)*HWT \qquad \text{Equation 2}$$

Upon the wait-time calculator 206 determining the predicted wait time, the wait-time communicator 208 (FIG. 2) of the wait-time predictor 112 communicates the predicted wait time to the user interface 114 (FIGS. 1 and 2) (block 410). For example, the wait-time communicator 208 communicates the predicted wait time to the user interface 114 to enable the user interface 114 to display the predicted wait time for the passenger 118 (FIG. 1) of the vehicle 102.

At block 412, the wait-time predictor 112 determines whether a preorder has been submitted to the commercial POI 104 by the passenger 118 of the vehicle 102. For example, the passenger 118 of the vehicle 102 may submit an order to be ready for the ETA via the user interface 114 of the vehicle 102 and/or the mobile device 316 of the passenger 118. If the wait-time predictor 112 determines that a preorder has been submitted, the example method 400 ends.

If the wait-time predictor 112 does not determine that a preorder has been submitted, the wait-time predictor 112 determines if the vehicle 102 has arrived at the commercial POI 104 (block 414). If the wait-time predictor 112 determines that the vehicle 102 is at the commercial POI 104, the example method 400 ends. If the wait-time predictor 112 does not determine that the vehicle 102 is at the commercial POI 104, the wait-time predictor 112 repeats blocks 402, 404, 406, 408, 410 to determine an updated predicted wait time (e.g., as the vehicle 102 continues to travel to the commercial POI 104). Further, blocks 402, 404, 406, 408, 410, 412, 414 are repeated until a preorder is submitted to the commercial POI 104 or the vehicle 102 arrives at the commercial POI 104.

FIGS. 5-8 illustrate respective displays 500, 600, 700, 800 of the user interface 114 that enable the passenger 118 (FIG. 1) of the vehicle 102 (FIG. 1) to select and receive information regarding the commercial POI 104 (FIG. 1). More specifically, the display 500 of FIG. 5 includes a text box 502 that enables the passenger 118 (e.g., a driver of the vehicle 102) to enter a search term 504 (e.g., "coffee nearby") via displayed keys 506. In other examples, the search term 504 may be entered by the passenger 118 via another method such as voice command.

Figure 5:
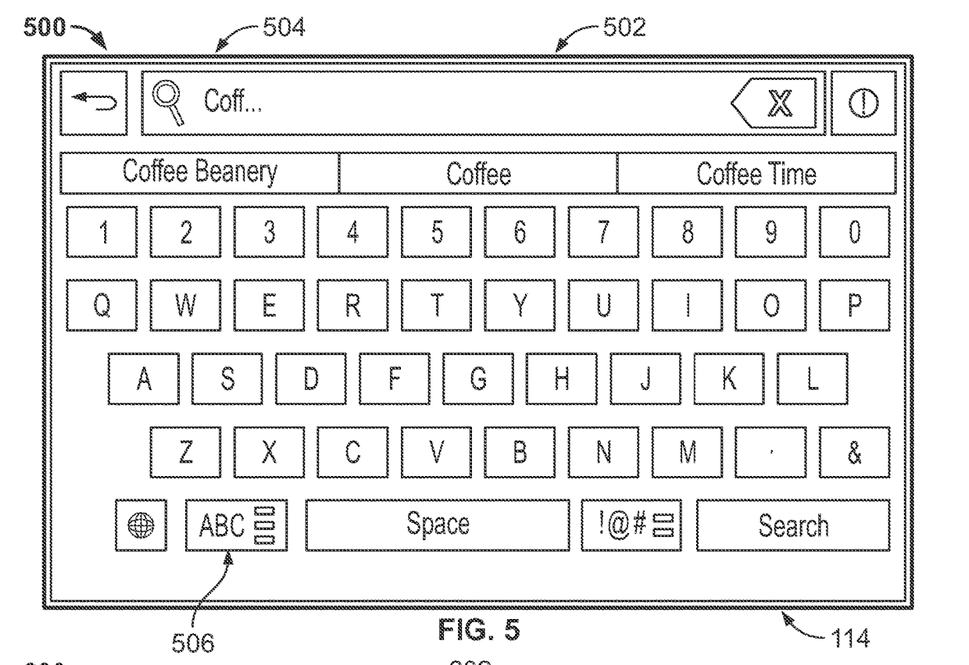
FIG. 5 illustrates an example display of a user interface of FIG. 2 that enables selection of a commercial point-of-interest.
Figure 6:
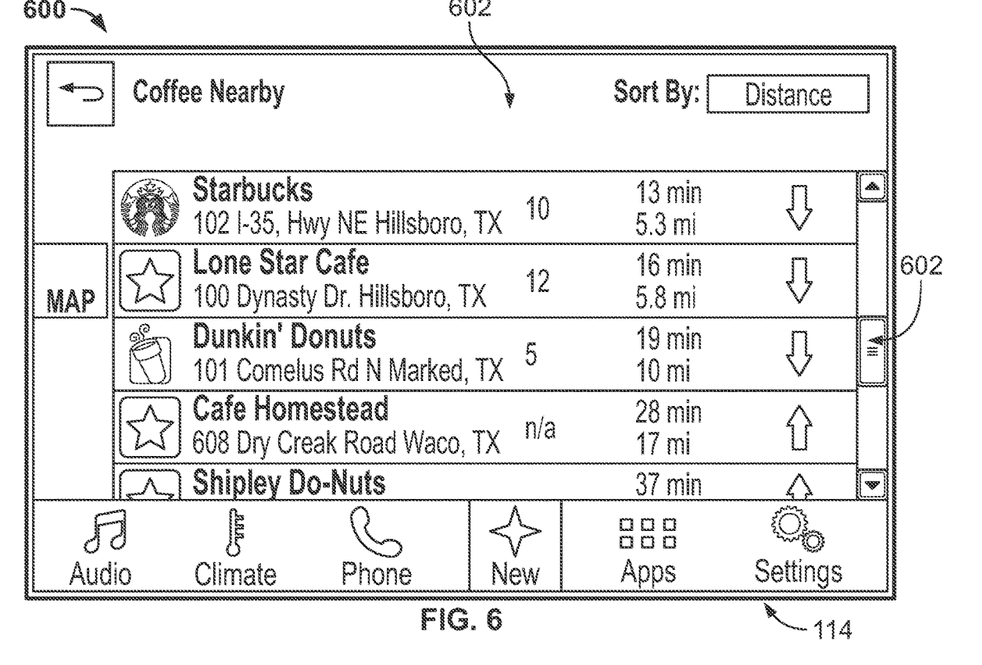
FIG. 6 illustrates another example display of the user interface of FIG. 2 that enables selection of a commercial point-of-interest.

The display 600 of FIG. 6 includes a list of points-of-interest 602 that match and/or satisfy the search term 504 of FIG. 5. For example, the list of points-of-interest 602 are identified, organized and/or selected based on a commercial category (e.g., coffee shops, dry cleaners, restaurants, post offices, etc.), a predetermined geographic region (e.g., Northern Indiana, the city of South Bend, the campus of the University of Notre Dame, etc.), a distance from a current location of the vehicle (e.g., within 5 miles of the current location), a distance from a predetermined travel route of the vehicle (e.g., within 0.5 miles along a travel route between South Bend, Ind. and Detroit, Mich.) and/or historical vehicle data (e.g., stored by the wait-time predictor 112 of FIGS. 1-3 and/or the user interface 114) indicating routine and/or habitual trips to a commercial point-of-interest (e.g., a trip to Tim Hortons® approximately every weekday morning at about 8:15 AM). As illustrated in FIG. 6, the display 600 includes a scrollbar 604 to enable the display 600 to present the list of points-of-interest 602 in a manner that is legible for the passenger 118. For example, the passenger may select the commercial POI 104 by tapping and/or pressing an item of list of points-of-interest 602 and/or via voice command.

Figure 7:
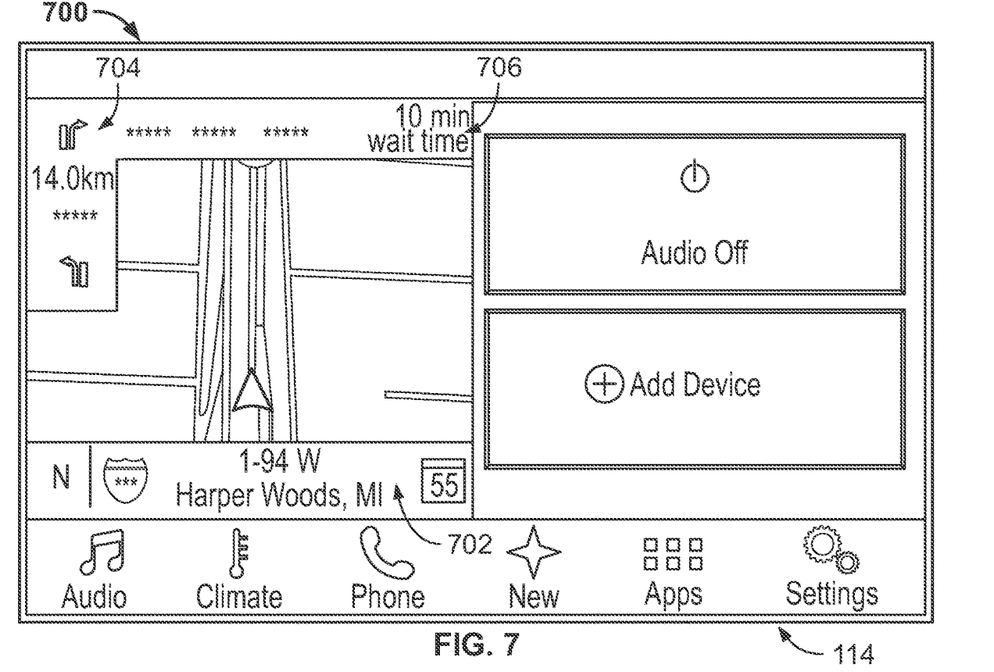
FIG. 7 illustrates another example display of the user interface of FIG. 2 that displays a predicted wait time at a commercial point-of-interest.
Figure 8:
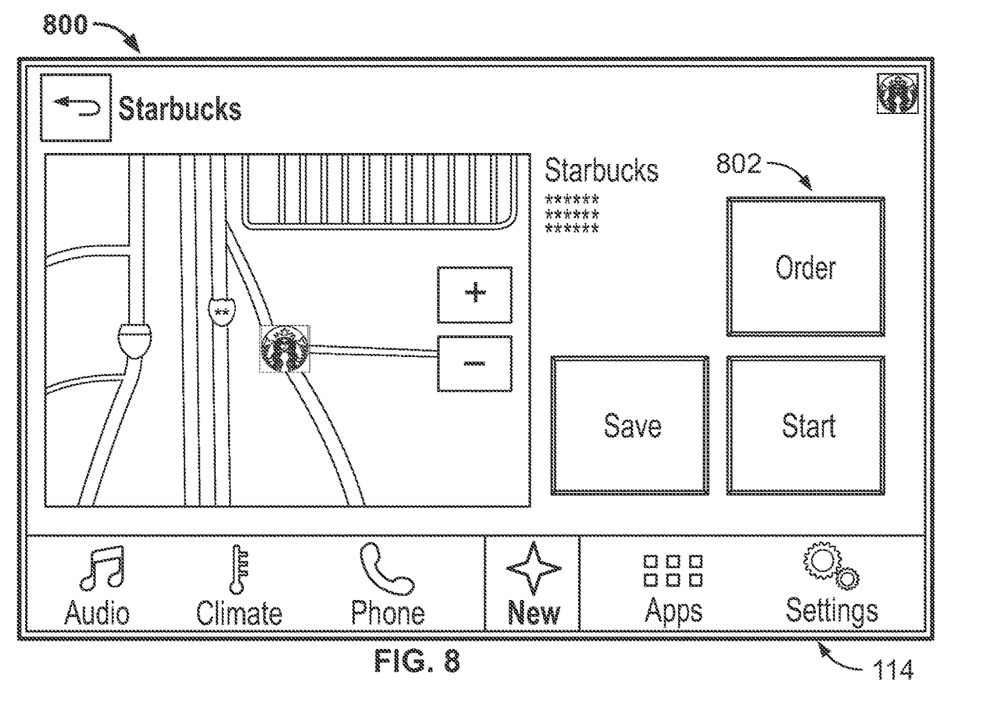
FIG. 8 illustrates another example display of the user interface of FIG. 2 that enables submission of a preorder to a commercial point-of-interest.

The display 700 of FIG. 7 includes a map 702 that provides a current location of the vehicle 102 and directions to the selected commercial POI 104. In the illustrated example, the display 700 provides a distance 704 (e.g., 14.6 kilometers) to the commercial POI 104. Additionally or alternatively, the display 700 may provide an ETA for the commercial POI 104. Further, the display 700 of the illustrated example provides a predicted wait time 706 (e.g., a 10 minute wait time). In some examples, the user interface 114 may audibly communicate the distance 704 to and/or the predicted wait time at the commercial POI 104 to the passenger 118. As illustrated in FIG. 8, the example display 800 enables the passenger to submit a preorder to the commercial POI 104 (e.g., via a preorder button 802 and/or voice commands) that is to be ready for pickup at the estimated time of arrival to enable to the passenger to reduce and/or eliminate an amount of time that he or she will wait in a queue (e.g., the queue 122 of FIG. 1) at the commercial point-of-interest 104.

Figure 9:
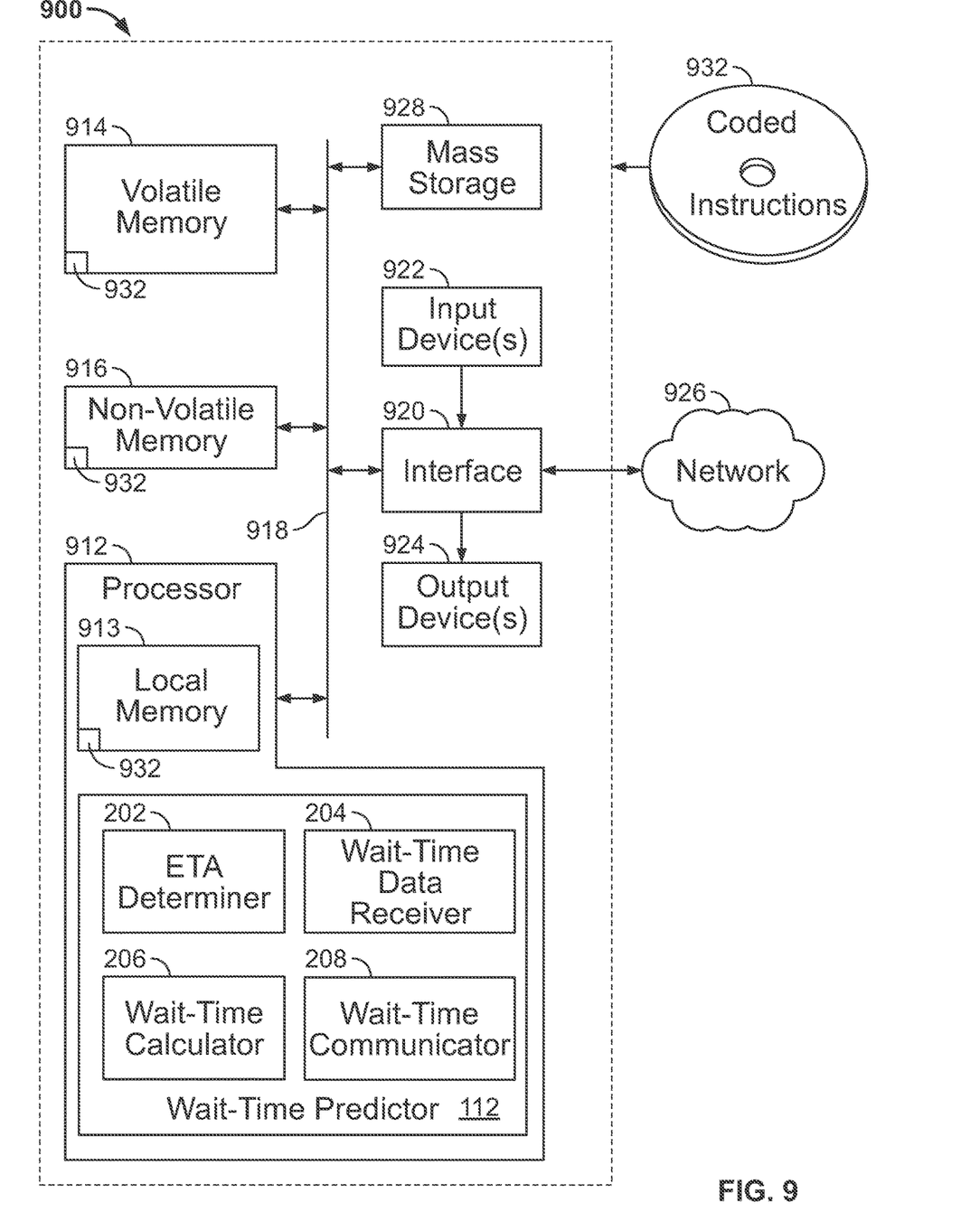
FIG. 9 is a block diagram of an example processor system structured to execute the example machine readable instructions to implement the method of FIG. 4 and the wait-time predictor of FIGS. 1 and/or 2.

FIG. 9 is a block diagram of an example processor platform 900 structured to execute instructions to implement the method 400 of FIG. 4 and the wait-time predictor 112 of FIG. 2. The processor platform 900 can be, for example, a server, a personal computer, a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The processor 912 of the illustrated example includes the ETA determiner 202, the wait-time data receiver 204, the wait-time calculator 206, the wait-time communicator 208 and/or, more generally, the wait-time predictor 112.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 to implement the method 400 of FIG. 4 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture may be used to determine a predicted wait time at a commercial point-of-interest for an estimated time-of-arrival of a vehicle based on historical wait-time data and current wait-time data of the commercial point-of-interest. By utilizing the current wait-time data, the above disclosed methods, apparatus and articles of manufacture enable the predicted wait time to account for current conditions of the commercial point-of-interest when the current conditions are indicative of the conditions at the estimated time-of-arrival (e.g., when the vehicle is near the commercial point-of-interest). Further, by utilizing the historical wait-time data, the above disclosed methods, apparatus and articles of manufacture enable the predicted wait time to account for historical conditions of the commercial point-of-interest when the current conditions may not be indicative of the conditions at the estimated time-of-arrival (e.g., when the vehicle is far from the commercial point-of-interest).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   determining an estimated time-of-arrival of a vehicle at a commercial point-of-interest;
   obtaining current wait-time data and historical wait-time data for the estimated time-of-arrival for the commercial point-of-interest;
   determining, via a processor, a predicted wait time for the estimated time-of-arrival based on the current wait-time data, the historical wait-time data, and a decay factor, wherein the current wait-time data is associated with a first weight, wherein the historical wait-time data is associated with a second weight, wherein the decay factor decreases as the vehicle approaches the commercial point-of-interest, and wherein the decay factor decreasing causes the first weight to increase relative to the second weight; and communicating the predicted wait time to a user interface of the vehicle, wherein obtaining the current wait-time data and the historical wait-time data includes wirelessly receiving the current wait-time data and the historical wait-time data via a telematics control unit that is installed in the vehicle and in communication with the processor.

2. The method of claim 1, further including identifying the commercial point-of-interest based on at least one of a commercial point-of-interest category, a predetermined geographic region, a distance from a current location of the vehicle, a distance from a predetermined travel route of the vehicle, or historical vehicle data indicating routine trips to the commercial point-of-interest by the vehicle.

3. The method of claim 1, wherein the current wait-time data for the commercial point-of-interest is collected via at least one of a camera installed at the commercial point-of-interest, a sensor installed at the commercial point-of-interest, an order processing system of the commercial point-of-interest, or a crowdsourcing application utilized by a customer waiting at the commercial point-of-interest.

4. The method of claim 3, wherein the historical wait-time data for the commercial point-of-interest is collected via at least one of the camera, the sensor, the order processing system, the crowdsourcing application, or a weather monitoring system.

5. The method of claim 1, wherein determining the predicted wait time of the commercial point-of-interest is further based on current weather condition data.

6. The method of claim 1, wherein obtaining the current wait-time data and the historical wait-time data includes wirelessly receiving the current wait-time data and the historical wait-time data via a mobile device that is in the vehicle and in communication with the processor.

7. The method of claim 1, further including:
receiving, via the user interface of the vehicle, an indication of a preorder of an item at the commercial point-of-interest; and
submitting the preorder to the commercial point-of-interest to be prepared for the estimated time-of-arrival of the vehicle.

8. An apparatus comprising:
an ETA determiner to determine an estimated time-of-arrival of a vehicle at a commercial point-of-interest;
a wait-time data receiver to obtain current wait-time data and historical wait-time data for the commercial point-of-interest, wherein the current wait-time data and historical wait-time data include a current queue size, a historical queue size, a historical wait time, and a decay rate factor, wherein the current wait-time data is associated with a first weight, wherein the historical wait-time data is associated with a second weight, wherein the decay factor decreases as the vehicle approaches the commercial point-of-interest, and wherein the decay factor decreasing causes the first weight to increase relative to the second weight;
a wait-time calculator to determine a predicted wait time for the estimated time-of-arrival based on the current wait-time data and the historical wait-time data; and
a wait-time communicator to communicate the predicted wait time to a user interface.

9. The apparatus of claim 8, wherein the wait-time data receiver obtains the current wait-time data from a current data aggregator that aggregates data collected from at least one of a camera installed at the commercial point-of-interest, a sensor installed at the commercial point-of-interest, an order processing system of the commercial point-of-interest, or a crowdsourcing application utilized by a customer waiting at the commercial point-of-interest.

10. The apparatus of claim 9, wherein the wait-time data receiver obtains the historical wait-time data from a historical data aggregator that aggregates data collected from at least one of the camera, the sensor, the order processing system, the crowdsourcing application, or a weather monitoring system.

11. The apparatus of claim 8, wherein the wait-time calculator determines the predicted wait time for the commercial point-of-interest further based on current weather condition data.

12. The apparatus of claim 8, wherein, to obtain the current wait-time data and the historical wait-time data, the wait-time data receiver wirelessly receives the current wait-time data and the historical wait-time data via a telematics control unit that is installed in the vehicle.

13. The apparatus of claim 8, wherein, to obtain the current wait-time data and the historical wait-time data, the wait-time data receiver wirelessly receives the current wait-time data and the historical wait-time data via a mobile device that is located in the vehicle.

14. A tangible computer readable storage medium comprising instructions which, when executed, cause a machine to at least:
determine an estimated time-of-arrival of a vehicle at a commercial point-of-interest;
determine a predicted wait time for the estimated time-of-arrival based on historical wait-time data of the estimated time-of-arrival, current wait-time data for the commercial point-of-interest, and a decay factor, wherein the current wait-time data is associated with a first weight, wherein the historical wait-time data is associated with a second weight, wherein the decay factor decreases as the vehicle approaches the commercial point-of-interest, and wherein the decay factor decreasing causes the first weight to increase relative to the second weight, and
wherein the current wait-time data for the commercial point-of-interest is collected via at least one of an order processing system of the commercial point-of-interest, or a crowdsourcing application utilized by a customer waiting at the commercial point-of-interest; and
communicate the predicted wait time for the estimated time-of-arrival to a user interface.

15. The tangible computer readable storage medium of claim 14, wherein the instructions further cause the machine to identify the commercial point-of-interest based on at least one of a commercial point-of-interest category, a predetermined geographic region, a distance from a current location of the vehicle, a distance from a predetermined travel route of the vehicle, or historical vehicle data indicating routine trips to the commercial point-of-interest by the vehicle.

16. The tangible computer readable storage medium of claim 14, wherein the instructions further cause the machine to submit a preorder to the commercial point-of-interest to be prepared for the estimated time-of-arrival of the vehicle.

* * * * *